United States Patent [19]

Schmidt

[11] 4,115,661
[45] Sep. 19, 1978

[54] SINGLE CHANNEL PER BURST TDMA MULTIPLE TRANSPONDER NETWORK

[75] Inventor: William G. Schmidt, Gaithersburg, Md.

[73] Assignee: Satellite Business Systems, McLean, Va.

[21] Appl. No.: 779,874

[22] Filed: Mar. 21, 1977

[51] Int. Cl.² .............................................. H04J 3/06
[52] U.S. Cl. ................................... 179/15 BS; 325/4
[58] Field of Search ........................ 179/15 BS; 325/4

[56]  References Cited
U.S. PATENT DOCUMENTS
4,004,098  1/1977  Shimasaki ................... 179/15 BS Primary Examiner—David L. Stewart
Attorney, Agent, or Firm—Pollock, Vande Sande & Priddy

[57]  ABSTRACT

A time division multiple access (TDMA) communication system has a plurality of geographically separated stations including a first group of stations, each of which can communicate with any other station in the first group through a first transponder in a predetermined portion of a TDMA frame (intra-group traffic), and a second group of stations, each of which can communicate with any other station in the second group through a second transponder in a predetermined portion of a TDMA frame associated with the second transponder (intra-group traffic). The TDMA frames of the first and second transponders are synchronized and inter-group traffic, i.e., communications between a station in the first group and a station in the second group, takes place in another predetermined portion of each of the frames which is exclusive of the predetermined portion of both frames used for intra-group traffic. Transponder hopping is employed without requiring needless duplication of terminal equipment and, at the same time, assuring non-overlapping transmissions through the same transponder.

24 Claims, 4 Drawing Figures

SINGLE CHANNEL PER BURST TDMA MULTIPLE TRANSPONDER NETWORK

FIELD OF THE INVENTION

The present invention relates to multi-transponder TDMA communication networks.

BACKGROUND OF THE INVENTION

Although a relatively recent addition to communication technology, time division multiple access (TDMA) has become an acceptable technique for use with transponders located in synchronous or quasi-synchronous earth orbit. Conventionally, a transponder has an associated up-link frequency on which it receives from a plurality of stations. The transponder further has a down-link frequency on which it transmits. Time division techniques place a number of channels in a single frequency. To allow multiple stations to talk to each other through a single transponder on common up-link and down-link frequencies, proper timing is essential. To prevent garbling, the transmissions from each of the different stations must be received in time sequence at the transponder. In order to efficiently utilize the capacity of the transponder, proper timing is achieved through timing from a common marker or reference burst transmitted to each of the stations through the transponder. The reference burst defines a frame which is further conceptually subdivided into a plurality of time slots. Each of the stations is allowed to transmit, in burst form, and each burst is aimed at a different slot. Thus, the frame includes the reference burst, and a plurality of slots for traffic. To make control of the network tractable, a further portion of the frame is provided for supervisory signalling purposes, i.e., to allow changing the slot allocations among the stations, etc.

One typical control problem that must be solved is contention between the stations for available traffic slots. The solution of the control problem must also take into account the round trip propagation time which is on the order of 300 msec. The round trip propagation time only becomes a complicating factor where slot allocation control is distributed. While it has been recognized that centralized slot allocation or real location is simpler than distributed control, centralized control presents significant disadvantages. As a result, distributed control is presently favored.

One manner in which the contention for traffic slots has been solved, in prior art single transponder systems, has been to provide each station, at all times, with information regarding which traffic slots are in use and which traffic slots are available. A station desiring to transmit in what it believes to be an available slot, first includes a message in a supervisory signalling time slot requesting the desired slot. That request is transmitted, through the transponder, to all other stations, including the transmitting station. Because of the round trip propagation delay the available information regarding traffic slots in use can be as much as 300 msec. "old". Therefore, after requesting a traffic slot, a station must delay using that slot until it hears its own transmission. If, in the time between it transmits its request, and the time it hears its request, it does not receive a request from another station for that traffic slot, then it can safely assume that it has received access for that traffic slot. Significantly, this procedure requires that each station "hear" transmissions from all other stations.

Present technology makes available transponders which have been optimized and have available a fixed bandwidth. This, of course, fixes the amount of traffic that can be funnelled through the transponder. For networks which have a greater need than a single transponder can supply, obviously, multiple transponder arrangements are required. Such arrangements necessitate multiple up-link and down-link frequencies. Each station in such a system may include separate apparatus, i.e., to transmit and to receive and to control the transmission and reception for each transponder. As disclosed in my prior U.S. Pat. No. 3,838,221, issued Sept. 24, 1974, multiple transmitters and receivers may be eliminated and each of the stations in a multi-transponder network may employ a plurality of up-link converters and/or a plurality of down-link converters, s well as a common TDMA control for each transponder, so that each of the stations can transmit to and receive from each of the transponders. However, as is further disclosed in the referenced patent, all stations need not have this equipment and certain of the stations can be restricted to communicating with certain of the transponders. For example, if the traffic through a particular station is expected to be relatively light, that station may be restricted to one or more transponder, less than all the transponders in the network by not providing that station with the necessary up- and down-link converters for the remaining transponders, and eliminating the corresponding TDMA control. At the same time, any station desiring communications with a particular station which is limited in the transponders available to it must, of course, communicate with that station through one of the available transponders. This is undesirable since it reduces system flexibility.

The technique of employing multiple transponders in a network, wherein a plurality of stations can transmit to or receive from more than a single transponder, is referred to as "transponder hopping" and is further discussed in my article "The Application of TDMA to the INTELSAT IV Satellite Series" appearing in the COMSAT Technical Review, Volume 3, Number 2, pages 257–75 (Fall 1973); see in particular pages 270–72.

The referenced patent also discloses that a single or common TDMA control can be utilized by synchronizing the different frames of the different transponders. However, the prior art does not teach a control procedure which establishes a signalling channel necessary for transponder hopping. For example, in up-link hopping where contention for available traffic slots is possible, a signalling channel is required to avoid simultaneous slot seizure. The known solution to simultaneous slot seizure requires each station to hear requests for traffic slots from other stations. Transponder hopping, however, implies that a station is transmitting into a transponder from which it may not receive, and thus cannot hear either its own transmission or, transmissions from other stations transmitting into that transponder. As a result, the prior art techniques for preventing simultaneous slot seizure cannot be applied.

On the other hand, in down-link hopping a signalling channel is necessary to alert a station to listen to a particular transponder at the appropriate time. In addition, of course, all stations must be informed of changes in slot timing and duration even if they may not be "listening" when the orders are transmitted.

Thus, a basic difficulty to be overcome is the integration of plural transponder networks having due regard for both optimum configuration and a solution to the control problem. For example, a station requires control apparatus, transmit and receive apparatus and an antenna to communicate in a TDMA mode with other stations in a network through a remote transponder. It is possible to duplicate one set of such apparatus at each station for each transponder. Obviously, this is not an optimum configuration and minimizing equipment duplication is desirable.

Before proceeding further, it is worthwhile to segregate TDMA communication systems into single channel per burst systems vs. multiple channel per burst systems since the specific requirements of these systems differ. In a single channel per burst (SCPB) a station, which may serve a plurality of users, acquires a specific slot in the TDMA frame in response to a specific user request. The link is established for the user and then the link is broken and the slot relinquished at the termination of the call. Multiple channel per burst systems (MCPB) on the other hand, merely allocate a portion of the station's burst to a user in response to a request, i.e., the link exists prior to the user's request.

Therefore, in SCPB, the network problem relates to the need for a station to acquire a slot and establish/disestablish a link, i.e., the called station must also acquire a slot for any return traffic. In MCPB, the problem relates to how variations in time slot duration (capacity) are handled. In both SCPB and MCPB there is, in addition, a need to alert the called station to the calling station's request for communication.

The present invention deals with the solution of the problet in the SCPB case. A companion application deals with the MCPB system.

It is therefore one object of the invention to provide control and signalling for multi-transponder communication networks which allow integration of distributed control apparatus for the plural transponders into one TDMA control. It is another object of the invention to provide such equipment in which equipment duplication is minimized by using transponder hopping techniques. It is another object of the invention to provide a method of operating multiple transponder TDMA networks which minimize the necessity for duplication of equipment.

SUMMARY OF THE INVENTION

These and other objects of the invention are fulfilled in a multi-transponder TDMA network having a first transponder and a group of stations communicating with each other through said first transponder in a first TDMA frame and a second transponder and a second group of stations communicating with each other through said second transponder in a second TDMA frame; intragroup communications are confined to predetermined portions of first and second TDMA frames which are synchronized, said portions overlap each other in time leaving other portions of both frames available for intergroup traffic. The intergroup traffic is allowed to proceed in the other portions of said frames, go and return channels existing through separate transponders using transponder hopping techniques, either up-link or down-link.

In a preferred embodiment of the invention, the go and return channels occupy associated time slots in both frames requiring only a single slot seizure to provide both go and return channels.

BRIEF DESCRIPTION OF THE DRAWINGS

The present invention will now be disclosed to allow those skilled in the art to practice the same in the following portion of this specification when taken in conjunction with the attached drawings in which.

DETAILED DESCRIPTION OF THE INVENTION

Figure 1:
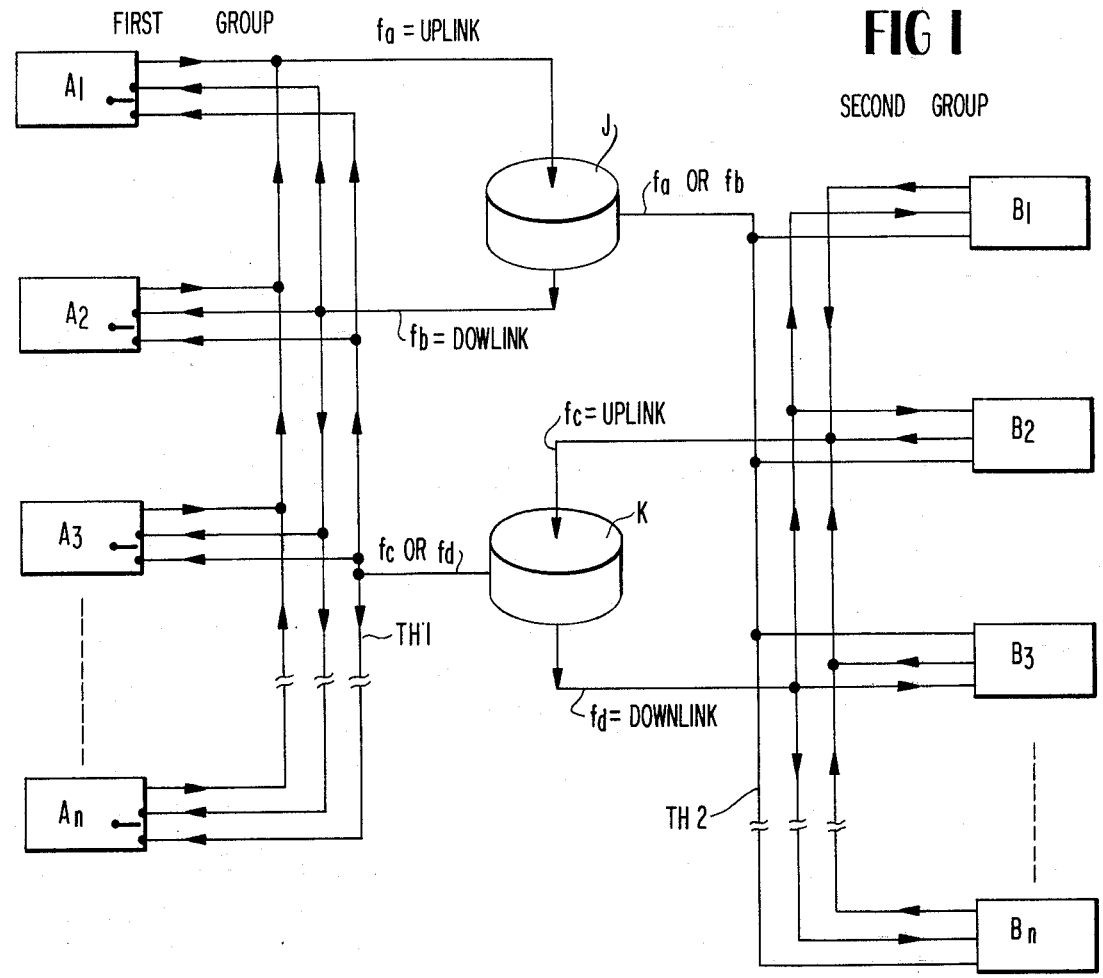
FIG. 1 is a schematic showing of plural groups of stations employing the invention in a multi-transponder satellite communication system.

FIG. 1 illustrates, in schematic form, a multi-transponder TDMA network operating in accordance with the principles of the invention. A transponder J is associated with a first group of stations $A_1$-$A_n$ communicating among themselves employing time division multiple access techniques, and using a common up-link frequency $f_a$ and a common down-link frequency $f_b$. In similar fashion, a second group of stations $B_1$-$B_n$ communicate among themselves through a second transponder K employing a common up-link frequency $f_c$ and a common down-link frequency $f_d$, using time division multiple access techniques. Up to this point, the apparatus illustrated in FIG. 1 is merely two separate TDMA communication networks. In order to allow first group stations to communicate with second group stations, transponder hopping is employed. To that end, a first transponder hopping link TH1 is provided to enable any of the first group of stations to establish communications through transponder K, with any of the second group stations. Likewise, a second transponder hopping link TH2 is provided to enable any of the second group stations to communicate, through transponder J, with any of the first group stations. To represent the links referred to, FIG. 1 shows different solid lines to represent different links, and lines coupled together represent a common link. To represent down-link hopping, for instance, TH1 can represent a down-link ($f_d$) from transponder K to the first group stations and TH2 can represent a down-link ($f_b$) from transponder J to the second group stations. Accordingly, each first group station has a switch to select the link it will receive, $f_b$ (from transponder J), or $f_d$ (from transponder K). Likewise, each second group station includes a switch to select the link it will receive, $f_d$ (from transponder K) or $f_b$ (from transponder J).

Up-link hopping (not illustrated) is effected by using TH1 as an up-link from the first group stations to transponder K ($f_c$) and using TH2 as an up-link from second group stations to transponder J. The switches at the first group station can select the up-link, $f_a$ (to transponder J) or $f_c$ (to transponder K). Likewise, the switches at the second group station can select the up-link, $f_c$ (to transponder K) or $f_a$ (to transponder J).

It should be apparent that the operation of the switches must be synchronized and the control of these switches and the manner in which effective intra- and inter-group communications are effected will now be explained.

Figure 2:
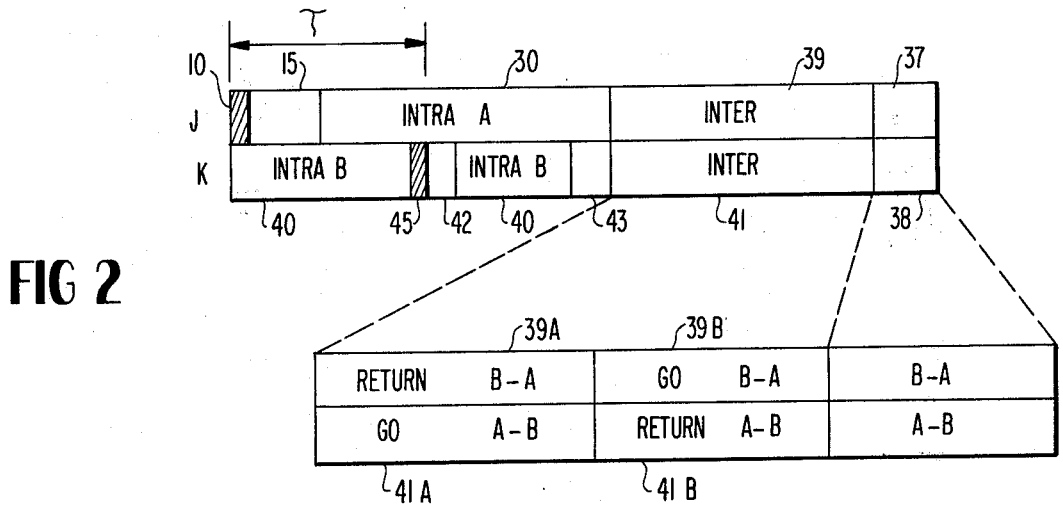
FIG. 2 illustrates the TDMA frames of the transponders.

FIG. 2 illustrates TDMA frames for the transponders J and K, each frame identified by the transponder reference character. Thus, TDMA frame J includes, as is conventional in the art, a reference burst 10, and a portion 15 provided for supervisory signalling purposes. In addition, the frame includes a portion 30 provided for the transmission of traffic among first group stations, sometimes hereinafter referred to as intra or intra-group traffic. Likewise, the frame for transponder K includes a reference burst 45. Reference burst 10 is displaced from reference burst 45 by a constant time delay $\tau$, implying that the frames are synchronized with each other. Also included in the frame K is a portion 42 for supervisory signalling and a portion identified as 40 and labelled intra B, for communications exclusively among stations in the second group. In FIG. 2, the intra B frame portion 40 is divided into two discrete portions although this forms no part of the present invention. Likewise, displacing the reference bursts 10 and 45 from each other is desirable, although not necessary. The respective portions of the frames J and K provided for intra group traffic overlap, at least in part, and also leave remaining simultaneously occurring portions of each of the frames for intergroup traffic and signalling. As is shown in FIG. 2, therefore, frame J includes a portion 37 for inter-group signalling and a portion 39 available for inter-group traffic. Likewise, the frame for transponder K includes a portion 41 set aside for inter-group traffic and a portion 38 available for inter-group signalling purposes. Since, as will be discussed, the effective inter-group portions of the frames must occur simultaneously and since there is no assurance that the intra portions of the frames are of identical duration, frame K portion 43 is illustrated to equalize the durations of the intra portions of the frame.

To indicate how FIGS. 1 and 2 are correlated, consider the use of down-link hopping and assume a station (either in the first or second group) is transmitting the synchronized reference bursts 10 and 45, with the time relationship shown in FIG. 2. The switches in the first group station are set to receive on the down-link from transponder J($f_b$) and the switches in the second group stations are set to receive the down-link from transponder K($f_d$). The traffic and signalling in the J frame is limited to portions 30 and 15 and the traffic and signalling in the K frame is limited to portions 40 and 42, respectively. Thus, at the transponders the J frame portions 37 and 39 are empty and the simultaneously occurring K frame portions 38 and 41 are blank. To allow first group stations to transmit to the second group stations, the first group traffic is placed in the J frame portion 39 and the switches in the second group stations are operated for the frame time 39, 37 (which is simultaneous with 41, 38). With the switches operated the second group stations can receive on $f_b$, i.e., the down-link from transponder J, corresponding to the transmission of the first group stations. Correspondingly, the switches at the first group stations are operated so that the first group stations receive the down-link from transponder K. The switches are operated for the frame time including 41, 38, which is simultaneous with 39, 37. Thus, the first group stations receive the transmissions of the second group. The switch positions are thereafter changed at twice the frame rate. In this fashion, go and return channels between stations in the first and second groups are provided. More particularly, consider a call initiated by station $A_1$, to be received by called station $B_1$, the traffic is placed in a slot in portion 39. When the $B_1$ station receives the frame portion 39 a go channel is established. The return channel is located in frame K portion 41, and when it is received by station $A_1$ the return channel is established.

Figure 3:
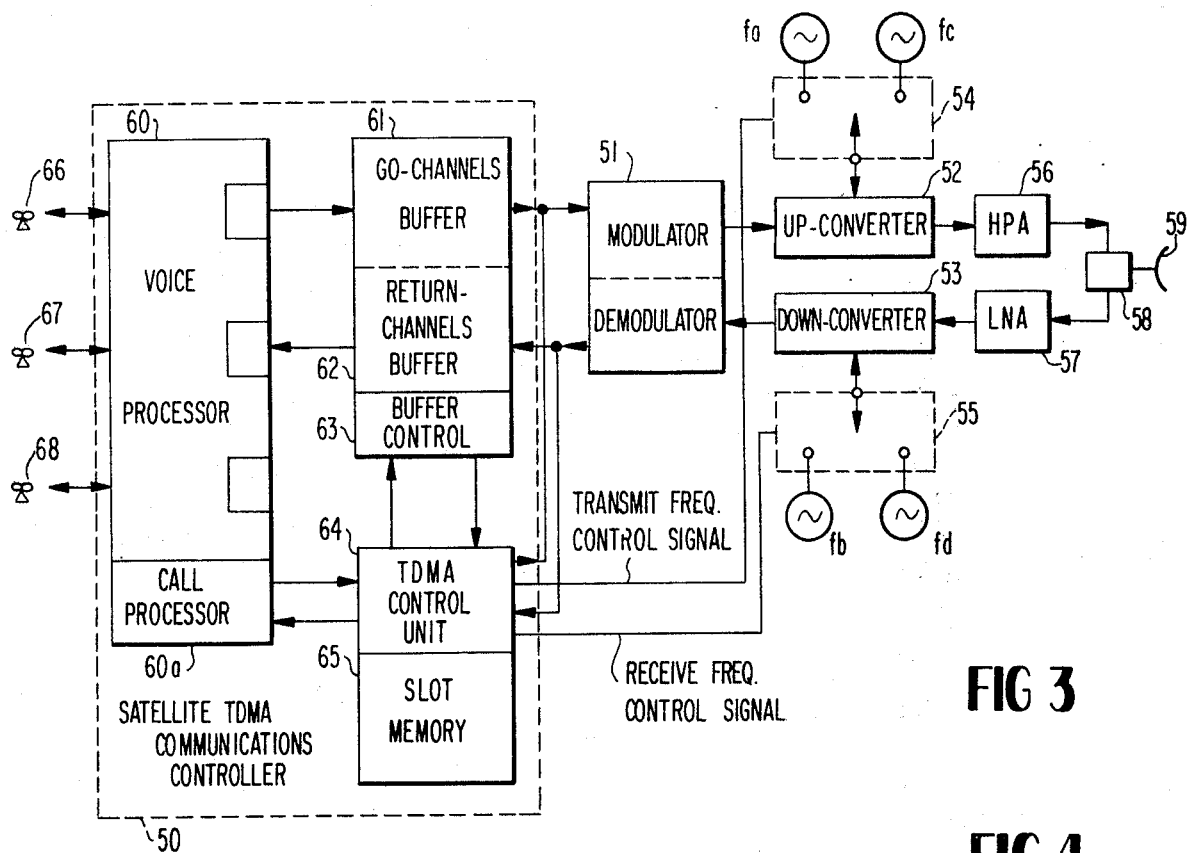
FIG. 3 illustrates the equipment at a typical station.

FIG. 3 illustrates typical ground station apparatus which includes satellite TDMA communication control 50, a modulator-demodulator 51 which is coupled through an up converter 52 to high powered amplifier 56, and through a conventional diplexer 58 to an antenna 59. Likewise, the antenna 59 and diplexer 58 are coupled through a low noise amplifier 57 and down-converter 53 to the demodulator. Connected to up-converter 52, through a switch 54 are a pair of oscillators generating respectively $f_a$ and $f_c$. Likewise, coupled to down-converter 53 through a switch 55 are another pair of oscillators generating respectively $f_b$ and $f_d$. Rather than using a single converter and switching between oscillators, it may be preferable to simply provide a pair of converters, each with an oscillator of a frequency different from the oscillator of the other converter, and switch from one converter to another.

Bi-directional informational flow apparatus is coupled to the controller 50 from terrestrial equipment such as the illustratively shown handsets 66–68. Those skilled in the art will, of course, understand that any other conventional data sources or sinks can be employed. Signals from such apparatus are conventionally coupled to the controller 50 where they are applied to a voice processor 60 including a call processor 60a. Voice processor 60 has an output to a go-channel buffer 61 for each of its inputs, and likewise, the return-channel buffer 62 provides an output to the voice processor 60 for each of the inputs to the voice processor. The modulator 51 is driven by the output of the go-channel buffer 61 or the TDMA control unit 64, and the demodulator drives both the return channel buffer 62 and the TDMA control unit 64. In addition, TDMA control unit 64 controls a buffer controller 63 and also has access to a slot memory 65. The call processor 60a associated with the voice processor 60 provides inputs to the TDMA control unit and receives inputs therefrom.

In many respects, the apparatus shown in FIG. 3 is conventional. In normal operation, when a user, represented by the handset 66 indicates a communication request by identifying the called station, the call processor 60a responds by forwarding the request to the TDMA control unit 64. By accessing slot memory 65, the control unit 64 initiates a process of slot acquisition for the user 66. For present purposes we can assume that the apparatus illustrated in FIG. 3 is located at one of the first group stations, and the users call is directed to another first group station. The TDMA control unit 64 in a conventional fashion, initiates a slot request for one of the believed-to-be-available slots as indicated by the contents of the slot memory 65. For such a request, a slot is chosen which exists in the intra group communication portion of the frame. As is conventional in the art, if the transmitted request is received from the transponder before another station has requested the desired slot, the control unit has available to it a go-channel for the user 66. The conventional call processing includes functions necessary to establish the return path from the called station to the calling station illustrated in FIG. 3. When those functions are completed and manifested to the call processor 60a, the user 66 is allowed to proceed with his communications over the now-established go- and return-channels. Assuming, as we have, that the user requested an intra-group call (to another station in the first group) then the time slots employed for go and return traffic would appear in the intra group portion of the associated frame.

For the purposes of describing operation of the invention, we will assume that the system employs up-link hopping, extension to down-link hopping should be apparent, and will briefly be described later. For up-link hopping, switch 55 is set to $f_b$ and only switch 54 is operated to provide either the up-link corresponding to $f_a$ or $f_c$. Actually, in a system employing up-link hopping, the switch 55 may be eliminated along with the unnecessary oscillator or down-converter. The slot memory 65 includes a list of available slots in the inter-group portion 41 of frame K. Similar lists of available slots in the frames J and K are provided in a slot memory 65 for stations in the second group.

When a user, such as the user 66, desires to communicate with a station in the second group, call processor 60a provides this information to the TDMA control unit 64. After making a selection of available slots 65 in the appropriate portion of the appropriate frame, the station must gain access to the slot. For inter-group calls, two functions must be performed by the signalling. Firstly, since the data in slot memory 65 may be as much as 300 milliseconds old, the slot must be acquired by transmitting a request therefore and receiving the return prior to another station's request for that slot. Likewise, the called station must be informed that there is a call destined for it. In the case of intra-group calls, both functions are performed by transmitting the slot request since both the calling and the called station are listening to the signalling slots. However, for intergroup calls, two transmissions must be made. A first transmission is made in the intra-group signalling portion 15. This informs all other stations in the first group that the particular station is requesting a specified traffic slot in the inter-group traffic portion 41. Recall that only first group stations contend for portion 41 of frame K since we have assumed up-link hopping. If the calling station hears its own transmission before another station in the first group makes a request for the identical traffic slot, then it has acquired that slot and a go-channel is established. In addition, however, in order to inform the called station (in the second group) that a call is coming in, the same information is provided in the inter-group signalling portion 37. Preferably the transmission to the second group is delayed until the calling station has acquired a time slot. Before the call can be completed, the called station must, in some fashion, establish a return channel. One method is to use the same procedure at the called station, although a preferred embodiment is disclosed which simplifies this procedure. When the go and return channels are established, the TDMA control unit 64 will allow call processor 60a to enable the call to proceed.

Multiple seizure of identical traffic slots in the intra-traffic portion 30 is prevented by the conventional arrangement for traffic slot seizure. In a similar fashion, multiple seizure of the traffic slots in the inter-traffic portion 41 is prevented. That is, before a station acquires a traffic slot in either portion, it must transmit a request therefore. The request is transmitted so it will be heard by all other stations which could be contending for the desired slot. The request must be for an available traffic slot, and the requesting station must hear its request before any other station requests that slot. Corresponding operations are carried out by each of the stations in the second group, employing the other transponder frame.

In summary, each group employs normal TDMA techniques in generating and responding to the reference burst 15, an intra-group signalling portion 15 and the intra-group traffic portion 30. At the appropriate time of the frame the TDMA control unit 64 enables the switch (54 or 55) to enable up-link hopping or down-link hopping. With the switch operated to its intergroup position, any transmission from a first group station will be received by all of the second group stations. In similar fashion, second group stations transmit to first group stations. In this way, inter-group traffic is enabled.

In order to be effective when the first group stations are transmitting to the second group stations, no second group station should be transmitting to the second group stations and likewise, when the second group stations transmit to the first group stations, no first group station should be transmitting to the first group stations. To accomplish this, it is essential that the frames J and K be synchronized (although as is shown in FIG. 2, the reference bursts 10 and 15 need not occur simultaneously) and furthermore, the inter-group traffic and signalling portions of both frames J and K must occur simultaneously with portions 41 and 38. However, there is no requirement that a specific traffic or signalling slot in portions 39 or 37 have a corresponding traffic or signalling slot in portions 41 or 38.

To summarize, each group, before inter-group traffic can be enabled, must synchronize its respective transponder frame with the frame of the other group. Simultaneously occurring slots in both frames are cleared for inter-group traffic. When the foregoing is accomplished, a station in the first group, desiring communications with a second group station, transmits a slot acquisition request in the first groups intra-signalling portion of the first group frame. If no other first group station requests that slot, the station acquires it, and then transmits a similar message in the inter-group signalling portion of the frame. This alerts the addressed second group station that a message is coming.

For symmetrical communications (requiring both go and return channels) the second group station can then proceed to acquire an inter-group traffic slot for a return channel in the same fashion, although in the other frame. As shown in FIG. 2 (for down-link hopping) the inter-group traffic portion of frames J and K, that is, portions 39 and 41, can be further subdivided into portions 39A and 39B, and 41A and 41B, respectively. One portion 39B can be used exclusively for go channels and the other (39A) can be used exclusively for return channels, with a similar division for the K frame portions 41A and 41B. Thus, for example, a first group station requiring a traffic slot for a go channel would be restricted to portion 41A. Likewise, if a first group station required a return channel, it must be found in portion 41B.

The transition from intra-group to inter-group frame portions occurs when the up-converter (or down-converter) switches are thrown at each of the stations. The demarcation between portions 39A and 39B (and 41A and 41B) are controlled by the slot memory and the apparatus which allows slot acquisition. Thus, the second group stations transmit to the first group stations in both frame portions 39A and 39B and the division between these portions is a matter of convenience. Similar remarks hold for the division between 41A and 41B. There is, in other words, no requirement for a go and return channel, forming a single communication path, to have any specific relationship or to occur simultaneously in the frames.

Figure 4:
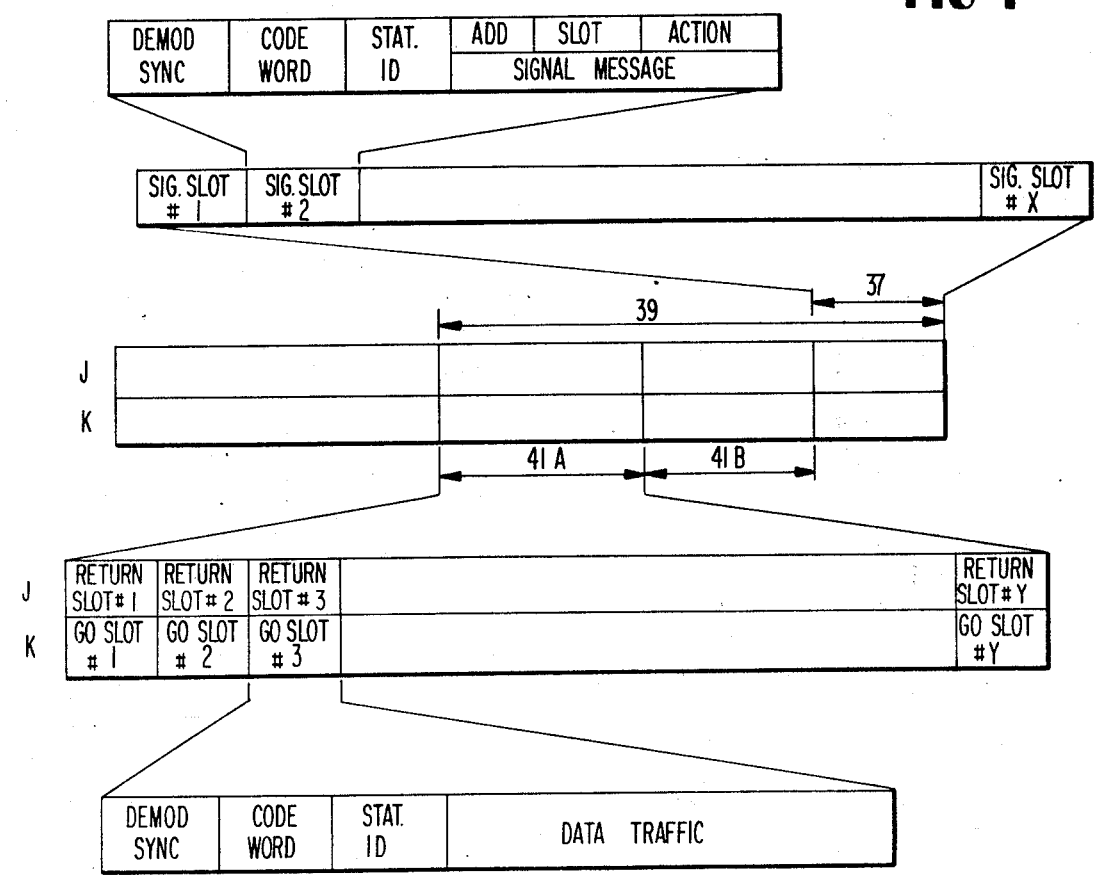
FIG. 4 is a more detailed showing of selected portions of the TDMA frames for a preferred embodiment.

While there is no necessity for having go and return channels occur simultaneously or otherwise have a special relationship, if those channels are related, substantial advantages can accrue, as will now be explained. FIG. 4 illustrates, in some detail, an example of time slot arrangements in frames J and K for a system in which each go channel has an associated return channel, and as illustrated, these channels are simultaneously in the frames. Firstly, as is shown in FIG. 4, the inter-group signalling portion of the frames, portion 37, is broken up into a plurality of signalling slots, slots 1-X. Preferably, there is at least one signalling slot for each station. If we assume that the network relies on up-link hopping, then the second group stations are transmitting in the frame J in the signalling portion 37, and thus there should be a signalling slot for each of the second group stations. Likewise, frame K should include a signalling slot for each of the first group stations. A typical signalling slot, slot number 2, is further broken down in FIG. 4 to show a typical example of a signalling message. For purposes of description, the various traffic slots included within portions 39A and 41A of the frames J and K are shown in detail in FIG. 4. As shown there, each traffic slot in the frame J has a corresponding traffic slot in the frame K and both slots occur simultaneously. A corresponding or associated slot as used herein means that it is not normally available for acquisition except by the acquisition of the slot with which it corresponds, or with which it is associated. Thus, for instance, go slot number 2 (in transponder frame K) corresponds (in time) with the return slot number 2 in frame J. Although not illustrated, the portions 39B and 41B of the frames J and K similarly have corresponding traffic slots occurring simultaneously in the frame. With this arrangement, it is now possible to establish both the go and return channels with but a single slot seizure. For example, if we assume, as in the example previously explained, that a user connected with a station in the first group desires to communicate with a party whose communications are routed through a station in the second group, then his call initiates a seizure of a slot in the inter-group portion of frame K, for example, go slot number 2. Since, by definition there exists a corresponding return slot number 2 in transponder frame J, no slot seizure is required for the called station. This facilitates communications in a number of respects. In the first place, the functions required to be performed for slot seizure consume time, and by this procedure that time delay can be minimized. Furthermore, there is no assurance that a return slot will be available; however, by using corresponding time slots in each of the frames, then the called station is always assured of a return slot. In summary, for inter-group communications employing transponder hopping through two different transponders, every traffic slot in the inter-group portion of one frame has a corresponding inter-group traffic slot in the other frame. Since the corresponding slot is normally only available for a return channel use, whenever the go channel is unoccupied, the return channel is likewise unoccupied. Thus, seizure of a single slot in the go channel assures a corresponding slot in the return channel.

Although the example illustrated above employed corresponding slots which occur simultaneously in time, those skilled in the art will understand that simultaneously occurring corresponding time slots are not necessary to the invention, and, if for some reason, one desired the go and return slots to be non-simultaneous, nevertheless the invention can still be practiced. What is essential, however, is that the return slot must exist in the portion of the frame reserved for return channels, to insure that it will be available when the corresponding go channel slot is seized and that the return slot is not normally available except for use as a return channel related to the go channel.

The preferred embodiment has provided a pool of return channels at stations in one group which are normally only available for use in connection with the seizure of a go channel, by a station in another group. This assures an available return channel whenever a go channel is available. To implement the preferred embodiment, it is only necessary to reserve a pool of return channels, each comprising a time slot in the frame. Each time slot in the pool is associated with a different one of a plurality of go channels, each comprising a different time slot in the inter-group portion of a different frame. The slot memory in stations of one group only allows use of the time slot in the pool reserved for return channels when an associated go slot is seized by a station of another group and the go slot is part of a communication channel directed to a station of the one group.

The preceding discussion indicates that return slots are not normally available, which implies that under certain circumstances, such a slot can be used in connection with communications not involving the associated go channel. One specific example of such circumstance occurs in response to non-symmetrical communications, i.e., those not requiring both go and return channels. Data transmission is one example of such a non-symmetrical communication. Whenever this takes place the return channel is unused and unless an exception condition exists to the reservation of the return channel, it would be not only unused but unusable. To overcome this condition, a special marking can be employed for non-symmetrical communication which would allow use of the return channel, for only the duration of the non-symmetrical communication.

Those skilled in the art will understand that while FIG. 4 is an accurate time representation of the various time slots, and illustrates the relative occurrence at different slots in different transponder frames, FIG. 4 is referenced at the transponder. The relative time of occurrence of the different stations' transmission to achieve time displaced signals such as those illustrated in FIG. 4 is dependent on the geographic separation between the stations and the transponders. Where this description or the claims appended hereto refer to simultaneous traffic slots or transmission, these terms are referenced at the transponder.

What is claimed is:

1. A multi-transponder communication network for communication among a plurality of geographically remote stations comprising a first transponder associated with a first group of stations of said plurality, each of said first group of stations having means for establishing go and return communication links through said first transponder, each said link employing an identical pair of carrier frequencies, a first frequency for transmitting from a station to said first transponder, and a second frequency for transmitting from said first transponder to a station of said first group of stations, a second transponder associated with a second group of stations of said plurality, each of said second group of stations having further means for establishing go and return communication links through said second transponder, each said link employing an identical pair of carrier frequencies, a third frequency for transmitting from a station of said second transponder and a fourth frequency for transmitting from said second transponder to a station of said second group, said first group of stations including additional means for establishing go or return communication links with stations of said second group through said second transponder and said second group of stations including further additional means for correspondingly establishing return or go communication links with stations of said first group through said first transponder.

2. The network of claim 1 wherein said means employ time division multiple access with periodic reference bursts, said further means also employing time division multiple access with further periodic reference bursts, said reference bursts and further reference bursts establishing respective time division multiple access frames synchronized with each other.

3. The network of claim 2 wherein said further means and additional further means operate in predetermined portions of said time division multiple access frames.

4. The network of claim 3 wherein said predetermined portions of said frames occur simultaneously.

5. The network of claim 1 in which said further means and further additional means establish go and return communication links, respectively.

6. The network of claim 1 wherein said further means and additional further means establish return and go communication links, respectively.

7. A time division multiple access network for communication between a plurality of geographically separated stations through at least two satellite-located transponders, comprising a first transponder associated with a first group of stations of said plurality, each of said first group of stations capable of establishing go and return communication links through said first transponder using a first common up-link frequency and a first common down-link frequency, a second transponder associated with the second group of stations of said plurality, each of said second group of stations capable of establishing go and return communication links through said second transponder using a second common up-link frequency and a second common down-link frequency, said first group of stations capable of establishing go or return communication links with stations of said second group through said second transponder, exclusive of said first transponder, and said second group of stations capable of correspondingly establishing return or go communication links with stations of said first group through said first transponder, exclusive of said second transponder.

8. A time division multiple access communication network including a plurality of geographically separated stations and a plurality of satellite transponders in which a first group of stations of said plurality communicates with other stations in said group only through a first transponder and a second group of stations of said plurality communicates with other stations of said second group only through a second transponder, the improvement comprising:
means enabling communication between stations of said first and second groups comprising first switching means at stations of said first group enabling a communication link with stations of said second group through said first transponder and second switching means at stations of said second group enabling a communication link with stations of said first group through said second transponder, wherein said respective communication links are in complementary directions to enable go and return communication channels.

9. The system of claim 8 in which communications are carried out in respective repetitive frames and said first and second switching means are operated for a predetermined portion of said respective repetitive frames.

10. The system of claim 9 in which said first and second switching means are operated simultaneously in said frames.

11. The system of claim 9 in which said first switching means, when operated, enables the associated station of said first group to transmit to said second transponder and said second switching means, when operated, enables the associated station of said second group to transmit to said first transponder.

12. The system of claim 9 in which said first switching means, when operated, enables the associated station of said first group to receive from said second transponder and said second switching means, when operated, enables the associated station of said second group to receive from said first transponder.

13. The system of claim 10 in which said predetermined portions include a plurality of traffic slots, only a single station transmitting into a given slot.

14. The system of claim 13 in which said predetermined portions include a plurality of go traffic slots and a further separate portion of return traffic slots.

15. The system of claim 14 in which at least one go traffic slot has a corresponding return traffic slot normally available for use only with said go traffic slot.

16. The system of claim 14 in which each go traffic slot has a corresponding return traffic slot normally available for use only with said go traffic slot.

17. The system of claim 15 in which said at least one go traffic slot occurs simultaneously in said frames with said corresponding return traffic slot.

18. A method of TDMA communications between a station of a first group normally communicating with other stations of said first group through a first transponder having an up-link and down-link frequency, and a station of a second group, normally communicating with other stations of said second group through a second transponder having a different up-link and down-link frequency, comprising the steps of:
 a. synchronizing TDMA frames of said first and second transponders;
 b. controlling said station of said first group to communicate with other first group stations only in a first predetermined portion of said first transponder frame;
 c. controlling said station of said second group to communicate with other second group stations only in a first predetermined portion of said second transponder frame, said first predetermined portion of said second transponder frame overlapping, at least in part, with said first predetermined portion of said first transponder frame;
 d. enabling communication between said first and second group stations through said first transponder and complementary communication between said first and second group stations through said second transponder for a second predetermined portion of said frames exclusive of said first predetermined portions.

19. The method of claim 18 wherein said step (d) includes
  i. enabling said station of said first group to transmit to said second transponder;
  ii. enabling said station of said second group to transmit to said first transponder.

20. The method of claim 19 for communications initiated by said first group station and wherein said step (i) includes
  1. enabling said first group station to transmit in a one slot of a number of slots only in a selected segment of said second predetermined portion of said frame;
  2. enabling said second group station to transmit in another slot of a number of slots in a segment of said second predetermined portion of said frame, said another slot corresponding to said one slot.

21. The method of claim 20 wherein said one and another slots of steps (1) and (2) occur simultaneously in said frames.

22. The method of claim 18 wherein said step (d) includes
  i. enabling said station of said first group to receive from said second transponder, and
  ii. enabling said station of said second group to receive from said first transponder.

23. The method of claim 22 for communications initiated by said first group station and wherein said step (i) includes
  1. enabling said first group station to transmit in a one slot of a number of slots only in a selected segment of said second predetermined portion of said frame;
  2. enabling said second group station to transmit in another slot of a number of slots in a segment of said second predetermined portion of said frame said another slot corresponding to said one slot.

24. The method of claim 23 wherein said one and another slots of steps (1) and (2) occur simultaneously in said frames.

* * * * *